United States Patent [19]

Obrochta et al.

[11] 4,283,835

[45] Aug. 18, 1981

[54] CAMBERED CORE POSITIONING FOR INJECTION MOLDING

[75] Inventors: Frank T. Obrochta, East Hartford, Conn.; Ralph E. Disa, Hampden, Mass.

[73] Assignee: United Technologies Corporation, Hartford, Conn.

[21] Appl. No.: 136,600

[22] Filed: Apr. 2, 1980

[51] Int. Cl.³ .............................................. B22C 7/02
[52] U.S. Cl. ................................... 29/527.6; 164/45; 164/159; 264/275; 264/278; 425/129 R
[58] Field of Search ....................... 164/45, 34, 35, 25, 164/26, 137, 340, 60, 366, 367, 397, 133, 135, 113, 119, 120, 69, 70, 159; 249/61, 62, 107, 110; 264/278, 279, 275, 162; 425/572, 573, 568, 120, 129 R; 29/527.6

[56] References Cited

U.S. PATENT DOCUMENTS

| | | | |
|---|---|---|---|
| 3,074,112 | 1/1963 | Bobrow | 264/275 X |
| 3,659,645 | 5/1972 | Rose | 164/366 X |
| 3,662,816 | 5/1972 | Bishop | 164/366 |
| 3,965,963 | 6/1976 | Phipps et al. | 164/60 |
| 3,981,344 | 9/1976 | Hayes et al. | 164/26 |
| 4,068,702 | 1/1978 | Herold | 164/30 |
| 4,078,598 | 3/1978 | Kelso et al. | 164/30 |

Primary Examiner—Robert D. Baldwin
Assistant Examiner—K. Y. Lin
Attorney, Agent, or Firm—C. G. Nessler

[57] ABSTRACT

Disclosed is a system for precisely locating a cambered ceramic core within the cavity of an injection molding die, such as is used to form patterns for lost wax method casting of gas turbine airfoils. A combination of at least two independent sets of locators are used: one set of at least three is fixed and contacts the periphery of the core while the other set of at least two is movable and engages the centerline of the core. The two sets independently limit the various degrees of core freedom and maintain its position during injection molding. The concave side of the core is preferably contacted by the fixed locators since this biases deviations into the convex side of the part from which excess deviant material is more readily moved.

7 Claims, 3 Drawing Figures

FIG. I

CAMBERED CORE POSITIONING FOR INJECTION MOLDING

DESCRIPTION

BACKGROUND ART

1. The present invention relates to the field of injection molding, most particularly to the precision formation of wax patterns having ceramic cores for use in the "lost wax" method of metal casting.

2. The present invention, and much of the prior art, are uniquely related to the process of casting superalloys into the form of gas turbine airfoils. Airfoils, such as blades and vanes, are components characterized by very thin walls. To form such components using the low wax method, a wax pattern containing a thin and highly precise ceramic core must be made, typically by injection molding. The ceramic core of course determines not only the internal dimensions, but the thickness of the walls of the pattern and resultant cast part. Consequently not only must the core be made to an accurate dimension, but it must maintain its location during both the formation of the wax pattern and during the casting process. A typical method in the art is to grip the core at selected end points. However, in many turbine blades this is often only possible at one end; this coupled with the typical thin core cross section results in frequent core shifting. Schemes have been used to overcome this propensity, such as disclosed by Bishop et al in U.S. Pat. No. 3,662,816 where metal pins are inserted into the wax pattern after the pattern is formed around the core. These protruding pins are then incorporated into the shell mold formed around the pattern and thereby hold the core in place until the metal of the casting is introduced into the mold and sweeps them away.

Ceramic cored airfoils have been made for a number of years. But in the recent decade there has been demand for increasingly thin central passages (cores) and walls and highly complex configurations on the core surface and resultant airfoil interior. Strong, stable and precise cores, removable without damage to the cast article, are sought but the inherent technical conflicts limit the article quality. Deviations attributable to the core failures have been heightened also by prolongation of the casting time and temperature in newer directional solidification processes.

A significant technological strategy to overcome these problems involves the casting of an article around a thicker core, often called a strongback, followed by the separation of the article into two halves and the subsequent rejoining of the halves to form a gas turbine airfoil. The methods and rationales of this new approach are detailed in the patents mentioned below and the references therein.

But even though the use of a thicker core overcomes some of the problems, it is still necessary to precisely locate the core within the metal injection molding die. Several U.S. patents of the present assignee have disclosed previous approaches which have been taken to precisely locate the core. Phipps et al U.S. Pat. No. 3,965,963 and Hayes et al U.S. Pat. No. 3,981,344 do not address the means of holding the core during wax injection but do show how the core is held during casting, namely by means of the longitudinal flanges which also serve to define the bonding planes of the blade halves. Herold in U.S. Pat. No. 4,068,702 discloses a core held by higher temperature wax pins which are placed within the die on either side of the core, in combination with the edge flanges. The pins mate with raised and depressed portions of the core which also serve to provide corresponding points on the opposing blade halves to facilitate their subsequent location during bonding. Kelso and Obrochta (one of the present inventors) in U.S. Pat. No. 4,078,598 disclose another approach wherein the core is located in the injection molding die by pins which are colinear with and in close proximity to the bonding locators. Cooperating with these locators are fixed or retractable pins within the die. In both the foregoing Kelso et al and Herold disclosures, the pins are located generally along the longitudinal centerline of the core, while the core is also held by flanges at its periphery.

Now with further development of the total process of manufacturing turbine blades, new improvements on the foregoing approach were needed and are revealed herein. Control of the wall thickness of the casting is desired within tolerance of better than ±0.012 mm, for thicknesses of from 0.5 to 1.3 mm. The ceramic cores are made by an elaborate and costly process of consolidation and firing. While these processes are quite advanced they are nonetheless prone to producing cores which have unavoidable deviation both in thickness and contour, of the order of the sought tolerance. Consequently it has not in practice been found feasible to hold the cores between precise fixed locating points in the die without encountering an unacceptable degree of core breakage if the locating point spacing is set too tight, or shifting of cores on the other hand if the tolerance is set loose enough to accommodate the maximum core deviation. It should also be appreciated that the forces of injection molding of the wax are appreciable and thus the location of the core within the die must be both positive and adequate to resist change during injection molding. (The invention of Myllymaki "Injection Molding Thermoplastic Patterns Having Ceramic Cores" disclosed in application Ser. No. 136,599, filed on even date hereof, involves improved means for injecting wax into die containing cores, and has a relation to the present invention.)

Thus, there has been a need for improved location of cores within metal dies for injection molding. Further, since the present state of the art of ceramic core manufacture is that there will be inevitable deviations, there is a need for a method of getting the best part yield therefrom. That is, if there are to be deviations in a wax pattern and a gas turbine type article made therefrom, what is the best way of accommodating these deviations?

DISCLOSURE OF INVENTION

An object of the invention is to improve the location of cambered cores within injection molding dies, to produce more precise patterns with which to fabricate cambered hollow articles. A further object is to produce hollow walled articles such as turbine blades which have the most favorable disposition of minor deviations resulting from any core deviations.

According to the invention, a die has a combination of fixed locators and movable locators which cooperatively align the core in all six degrees of freedom. Preferably, three fixed locators, such as pins, are mounted on one side of the die to contact the concave side of the core at its longitudinal periphery; a like number of movable spring-loaded pins urge the core against the fixed pins. In conjunction with these foregoing pins, two sets of spring-loaded movable pins mounted on both sides of the die engage the core at either end of the centerline. While the peripheral pins provide axial location in one direction and rotational location in two modes, the centerline pins provide axial location in two directions and rotational location in one mode. Thus, the pins act independently of each other, but in cooperation to most accurately and positively align the core within the die.

The spring activation, or other yieldable force applied to the core, both causes the pins to firmly contact or engage the core and restrains all elements within the die from movement due to forces arising during injection molding. Other pins may be used in addition to the foregoing pins. For example, pins set slightly below the concave side surface contour datum will limit any deflection of the core caused by wax injection but will not interfere with the functioning of the prime locating pins of the basic invention.

The core is best located by fixed pins contacting the concave surface. In this way deviations due to core thickness are biased into the convex side of the hollow article where they are more easily compensated for as such by stock removal from the exterior surface of the convex side. Thus, better article yield and quality will result from practice of this core positioning procedure.

BEST MODE FOR CARRYING OUT THE INVENTION

The invention herein is described in terms of the fabrication of thin walled components, such as turbine blades and vanes, particularly using a core and process which enable the final fabrication of a component from joined halves. But it should be appreciated that the invention will be equally usable in the manufacture of other thin walled articles produced from patterns containing cores, including those involving processes other than casting, such as hot isostatic pressing, and to the formation of intermediate and final articles of manufacture from materials other than the wax polymer of the preferred embodiment.

The invention is usable in injection molding in multipart metal dies of various configurations. The processes of assembly and injection molding are described in the aforementioned copending application Ser. No. 136,599 of Myllymaki, filed on even date hereof, and reference should be made thereto for such details, as well as to the generally known art.

Figure 1:
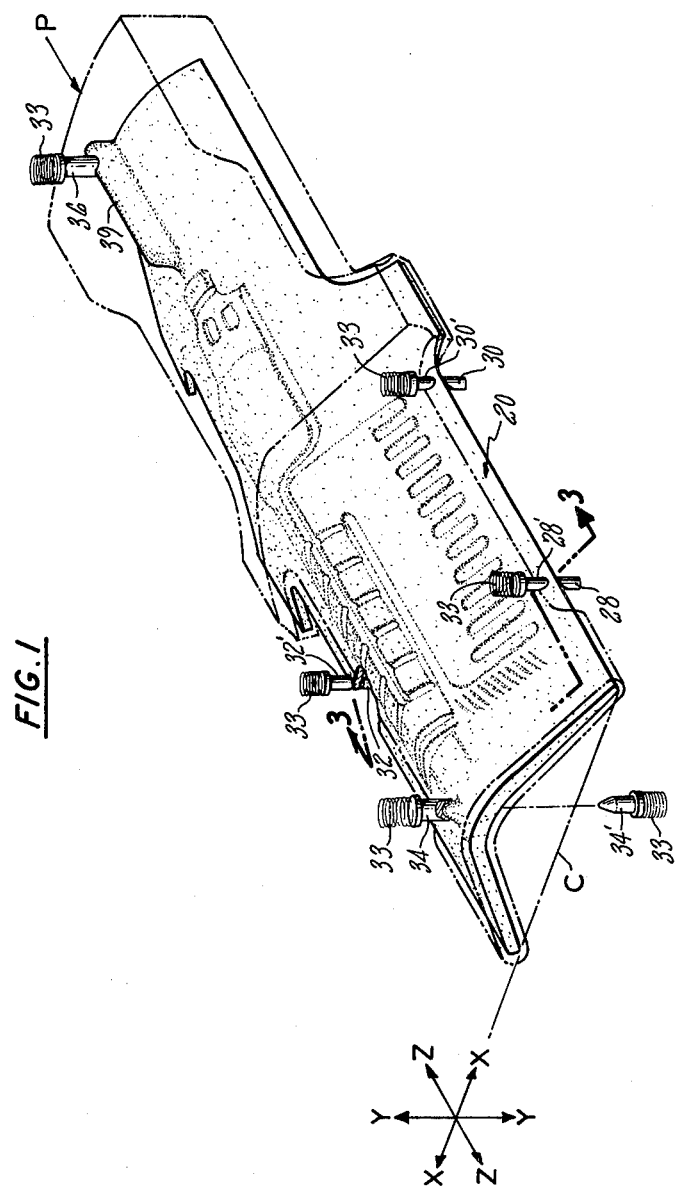
FIG. 1 is a perspective view of a core, showing in phantom the pattern to be formed thereabout, with diagrammatic representation of the die pin locators.
Figure 2:
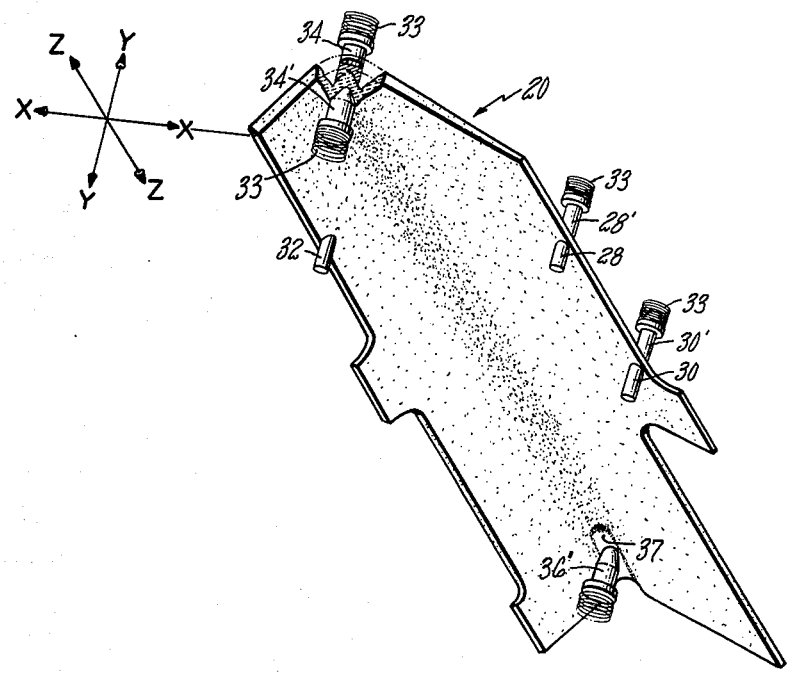
FIG. 2 is a perspective view of the underside of the assembly of FIG. 1.
Figure 3:
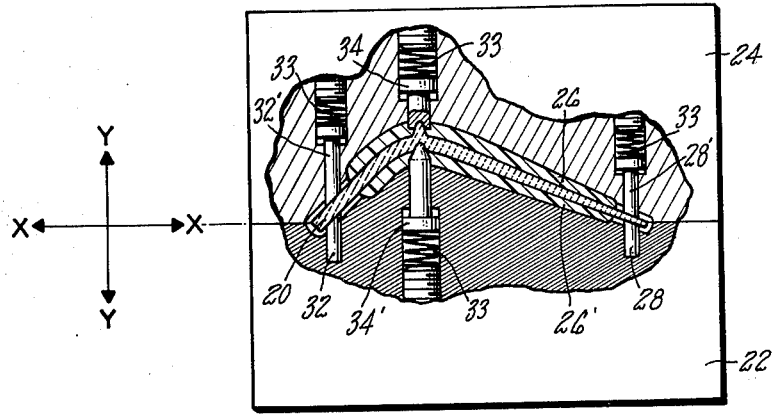
FIG. 3 is an end cross section of the assembly in FIG. 1, with addition of die elements and wax pattern.

FIGS. 1 and 2 show two perspective views of the same core with a phantom wax pattern of a blade shape therearound. FIG. 3 is a cross-sectional view of the same article shown in FIGS. 1 and 2, but with the addition of the metal die component which contains the locating pins with which the present invention is concerned. For simplicity and clarity of illustration, the die has been omitted from FIGS. 1 and 2; they are thus somewhat diagrammatic. The die is a multi-part metal assembly of a common external configuration such as will be familiar to those knowledgeable about injection molding, and one embodiment of which is shown in the Myllymaki application. The die defines an article which is comprised of a finished blade part shape with added material, especially at the ends, to carry out the purpose of casting and bonding, as described in the references. Thus, the core may be longer than the actual blade, but most critical for core location is in the portion of the die defining the actual blade airfoil.

Referring now to the Figures, a core 20 is generally centered between the parts 22 and 24 of a die which defines the outer dimensions of the component pattern P which is sought to be formed by injection molding. The core is cambered, as is the pattern exterior. By definition herein, the core pattern and die have common x, y and z axes. Referring to the core, the z axis is the longitudinal axis and the x and y axes are perpendicular thereto. The x axis lies generally along a chord C of the core. In the absence of the locating pins described hereafter, the die cavity formed by the opposing metal parts is of a dimension which will permit some movement of the core along and about all axes. Thus, the location within the cavity is solely determined by the pins operating in the manner described below. While the invention is described in terms of pins, it will be apparent that pin is but one specie of locator. Other movable elements will be readily seen to substitute for the movable pins, while other elements and even high points in the die will be seen to substitute for the fixed pins.

A minimum of three fixed pins 28, 30 and 32 (designated "peripheral pins") protrude from the first side of the die cavity. These receive the concave side of the core and thereby determine its location along the y axis. Cooperating with the fixed peripheral pins are three spring-loaded movable peripheral pins 28', 30' and 32', preferably but not necessarily in coalignment with the opposing fixed pins to avoid any localized deflection of the core. The movable pins act generally to push the core against the fixed pins. These movable pins, as well as others described hereafter are limited in their sliding travel from the die surface, such as by the shoulder arrangement shown, so that when the die is open and no core is present they will not escape. Similarly, to ensure that the peripheral movable pins consistently contact the contoured surface of the core they are desirably either pointed or restrained from rotation about their long axis, as by a keyway and slot or like device. The movable pins are resiliently loaded by springs 33 for which the tension may be changed to carry out the objects set forth herein. Other means to provide a yieldable force, such as fluid cylinders, gravity, elastomers, and the like may be employed as well. The three sets of peripheral pins are located along the longitudinal periphery of the core. Most desirably they are positioned to contact a portion of the core which extends beyond the blade part of the pattern. This is easily accomplished on the extended flanges of the split-blade design core. Since the fixed pins also serve to limit rotation about the z axis it is desirable that they be placed as far apart from the z axis as possible. When three pins are used, two will be present on one side of the central z axis, and one on the other side. Thus, the two which are on the same side will also serve to determine the position of the core with respect to its rotation about the x axis. It is preferred to space the two same-sided pins far apart to optimize their effect. But it is also desirable to maintain them within the finished blade-defining section of the die, as opposed to extensions added thereto for casting and bonding purposes, since this optimizes the dimensioning of the actual final article. While the use of three pin locations is the minimum which will carry out the aforementioned functions, it is also the most desirable, as there is complete assurance all pins will be contacted.

The fixed pins at their tips will be set to the points positioned along the surface datum of a core having no deviations from the desired configuration. By surface datum herein is meant the contour in space which the surface of the core is supposed to comply with when it is accurately made and positioned in the die. Preferably, the fixed pins are parallel to the y axis but since most simply the fixed pins are precisely located points in space adapted to receive the core, their orientation is not critical to their functioning. They are fixed during the operation of the die in injection molding, but they may be otherwise movable to facilitate precision adjustment during setup or to facilitate withdrawal of a pattern from the die (such as when the pattern surrounds pins unaligned with the withdrawal direction).

Turning for a moment to the other pins shown in the Figures, two sets of cooperating movable centerline pins 34, 34' and 36, 36' are disposed apart at either end of the z axis. These desirably are located at points far apart for maximum mechanical effect, and preferably outside the critical thin-walled airfoil portion of the article cavity. The core and centerline pins are adapted to positively engage each other to limit relative motion perpendicular to the movable pins' longitudinal axes, which lie parallel to the y axis of the die. The centerline pins on both sides of the die are resiliently movable along the y axis by action of springs. Accordingly, the centerline pins will not affect any of the motions controlled by the peripheral pins. However, the centerline pins will control the longitudinal movement of the core along the z axis, the longitudinal movement along the x axis, and rotation about the y axis.

The tensions in the opposing centerline pins are adjusted to provide either a neutral net force on the core, or more preferably a small bias in the direction of the concave side of the die cavity where the fixed peripheral pins are located and where seating is required, to aid the action of the movable peripheral pins, or substitute therefor when the movable peripheral pins are optionally omitted.

As shown, the centerline pins are preferably comprised of two distinct types insofar as modes in which the core is engaged. The tip mode (pins 34, 34') is comprised of a cup and cone configuration and this serves to fix core location along the z and x axes. The mode at the root end (pins 36, 36') comprised of a first pin 36' with a cone shape adapted to engage the slot 37 in the core concave side, and a second pin 36 which preferably contacts but does not laterally restrain the positive convex side core projection 39 corresponding to the slot. Engaging the core centerline from one side and contacting it only on the opposite other side as done at the root end may be done at the tip as well. It is advantageous in reducing some of the uncertainty in location due to tolerance variation on different sides of the core. Another usable embodiment is to put a pin through a hole provided in the core.

Other combinations of devices and restraint will be possible so long as the minimal functioning of the centerline pins is carried out as follows: at least one of the pin locations must provide restraint along the z axis. And restraint must be provided in the x direction at both ends of the z axis. Additional redundant functioning of the centerline pins may be provided, such as accomplishing z axis restraint at both ends, or by adding more pins. It may be noted that there might be some tendency for the peripheral locators to provide x-z plane positioning in a highly contoured datum surface which they contact. However, this will be incidental and usually slight owing to the absence of purposeful engagement points for the pins; the magnitude of the centerline pins' control far outweighs any provided by the peripheral pins.

In the particular embodiment just discussed, the functioning of the peripheral pins is accomplished by the fixed pins so long as the core is urged against them. It can also be seen that the movable centerline pins will accomplish their function if present only on one side provided they are urged against the core. Thus, generally, it would be possible to carry out the objects of the invention with minimally three fixed peripheral pins, and two movable centerline pins, provided the core is urged against the fixed peripheral pins and the movable pins are urged against the core. This may be accomplished by placing the movable pins on the second (convex) side of the die. This arrangement would comprise using only pins 28, 30, 32 and 34, 36, shown in the Figures. This minimum pin example may be suited to particular core configurations, but will produce some bending moment on the core. In contrast, the configuration described previously was such that there was practically a z-axis force balance at the centerline, while the movable peripheral pins provided the net force necessary to thrust and locate the part on the fixed peripheral pins, thus avoiding any bending moments.

Thus, from the foregoing, the pins have independent control of the various motions, but yet operate cooperatively to precisely locate the core. To summarize, the core is located in all six degrees of freedom by a unique combination of peripheral and centerline locators which achieves optimal alignment. The following table summarizes the control of motions according to the pin location:

| Axis of Motion | Type of Motion | |
| --- | --- | --- |
| | Longitudinal | Rotational |
| x | centerline | peripheral |
| y | peripheral | centerline |
| z | centerline | peripheral |

During wax injection, there easily can be hydrodynamic forces on the core due to flow of the polymer within the die and about the core. This force may not be evenly distributed on either side of the core and thus it will be a further function of the spring-loaded pins to resist any forces tending to lift the core off the fixed locating pins. Further, with the cone-shaped centerline pins and other like pins, there will be some tendency for hydraulic pressure to lift the pin from contact with the core. These forces must be resisted by the spring tension on the affected pins. Thus, in initial experiment, the spring tension in the pins will be adjusted suitably. The degree to which the spring tension must be increased over that necessary to simply push the core against the fixed locators is dependent on the pin configuration, the injection molding parameters, and the like. One is led to apply substantial force to the core to assuredly maintain core contact against the fixed pins and maintain the movable pins in engagement with the core. Thus, it will be better understood why it was said previously that it is preferred that the movable peripheral locating pins be coaligned with the fixed pins, and why the centerline pins be cooperating pairs. To do so avoids deflection of the core due to the spring loading.

A second set of one or more fixed peripheral pins may be added to the first side of the die to further limit the movement of the core during wax injection. These pins will be preferably located in the same regions as the basic three fixed locator pins, i.e., along the longitudinal periphery, but they may be located elsewhere. For example, a preferred embodiment will comprise two additional pins set on either side of the pin 32 and an additional pin set between pins 28 and 30. They will be set a slight distance (~0.05 mm) below the concave surface datum, or ideal concave core surface contour at which the fixed pins are set. The second set of the pins will not serve a function in the initial location of the core in the die and will not have associated movable pins. However, when wax is injected into the die there may tend to be deflection of the core at points between the supports provided by the fixed pins of the first set and the second set of fixed pins will limit the motion. Similarly, second-set type pins may be used elsewhere than the periphery and also in the second opposing side of the die.

In the preferred embodiment above the concave side of the core is pressed against the locating pins. Alternatively, it is possible to provide the first set of fixed pins on the second side of the die to contact the convex side of the core. However, it has been discovered that it is much more advantageous to locate the core off the concave side for the following reasons. A core may have various dimensional deviations which can include thickness and contour changes from the specified and desired datums. The past tendency has been to center the core as best as possible, to divide the errors evenly between the two sides of the pattern. However, if the core is instead positioned on the concave surface datum, the errors due to deviations in core thickness will be preferentially caused to cumulate in the convex side 26 of the pattern and casting made therefrom. Subsequently, after the casting is made, any excess material in a too-thick wall or due to a too-thin core may be readily removed by easy abrasive belting of the convex exterior surface. This procedure is in contrast to that which would occur if the core were centered or biased toward the convex side of the die where removal of material from the concave exterior surface would be much more difficult. (In the split-blade halves approach, the same considerations would apply, there being the additional limitation that material cannot be feasibly removed from the precision surfaces adapted to be bonded.) The invention set forth above will be found to optimally locate a core within a die and to produce the greatest yield of cambered parts meeting the desired dimensions.

Although this invention has been shown and described with respect to a preferred embodiment, it will be understood by those skilled in this art that various changes in form and detail thereof may be made without departing from the spirit and scope of the claimed invention.

We claim:

1. Apparatus for improving the precision of location of a core in an injection molding die usable for forming a thin walled cambered airfoil shape surrounding a cambered core having a longitudinal z axis and x and y axes perpendicular thereto, where the x axis lies generally along a chord of the core, the die having similar axes corresponding to the core and having two opposing sides generally facing the x-z plane, comprising:

a first set of at least three fixed peripheral locators positioned in a first side of the die at a core surface datum, the set having at least two locators spaced apart on one side of the z axis and at least one locator on the opposing side;
   at least two resiliently movable centerline locators positioned in the second side of the die and spaced apart generally along the z axis, adapted to engage a core, said centerline locators being movable generally parallel to the y axis;
   means for urging a core against the locators on the first side.

2. The invention of claim 1 further comprising additional resiliently movable centerline locators positioned in the first side of the die, acting in cooperation with the second side movable locators.

3. The invention of claims 1 or 2 further comprising movable second side peripheral locators placed directly in opposition to the fixed first side peripheral locators.

4. The method of producing a precision cambered hollow article, such as a gas turbine blade, using a cambered ceramic core and an injection molding die to produce a lost wax pattern, which comprises:

mounting the concave side of the core in the die on at least three fixed locators;
   urging the core against the fixed locators by applying force to the convex side;
   forming a pattern about the core within the die, forming a mold from the pattern and core, and forming an article from the mold, to bias deviations caused by the core into the convex side wall of the article; and
   altering the dimension of the external convex surface of the article, to thereby compensate for deviations in the core and produce an accurate finished part.

5. In the casting of cambered gas turbine components using an expandable pattern, such as in the lost wax method, the process of improving the location in a thermoplastic injection die of a core having a longitudinal z axis and x and y axes perpendicular thereto, where the x axis lies generally along a chord of the core, comprising:

contacting a first side of the core at its periphery by means of fixed locators, to accurately position the core along the y axis;
   contacting a second side of the core along its centerline by means of resilient movable locators, to accurately position the core along the x and z axes without interfering with the functioning of the fixed locators; and
   resiliently urging the core by said resilient movable locators in the direction of the fixed locators, to maintain the position of the core during injection of thermoplastic into the die.

6. The process of claim 5 which comprises providing three fixed locators at the periphery, and providing two movable centerline locators contacting the first side of the core at opposing z axis ends of the core.

7. The process of claim 6 which further comprises contacting the second side of the core with movable locators aligned with the locators on the first side.

* * * * *